United States Patent
Gilhousen et al.

[11] Patent Number: 5,864,760
[45] Date of Patent: Jan. 26, 1999

[54] METHOD AND APPARATUS FOR REDUCING THE AVERAGE TRANSMIT POWER FROM A SECTORIZED BASE STATION

[75] Inventors: Klein S. Gilhousen, Bozeman, Mont.; Roberto Padovani, San Diego, Calif.

[73] Assignee: Qualcomm Incorporated, San Diego, Calif.

[21] Appl. No.: 880,001

[22] Filed: Jun. 20, 1997

Related U.S. Application Data

[63] Continuation of Ser. No. 144,901, Oct. 28, 1993, abandoned.

[51] Int. Cl.$^6$ ............................................. H04Q 7/22
[52] U.S. Cl. .......................... 455/442; 455/63; 455/522; 455/562; 370/332
[58] Field of Search ..................... 455/436, 442, 455/524, 525, 63, 562, 522, 69; 375/200, 205; 370/332, 334

[56] References Cited

U.S. PATENT DOCUMENTS

| | | | |
|---|---|---|---|
| 3,819,872 | 6/1974 | Hamrick | 179/41 A |
| 4,004,224 | 1/1977 | Arens et al. | 325/2 |
| 4,112,257 | 9/1978 | Frost | 179/2 EB |
| 4,123,718 | 10/1978 | Lamper et al. | 325/474 |
| 4,211,894 | 7/1980 | Watanabe et al. | 179/2 |
| 4,222,115 | 9/1980 | Cooper et al. | 375/1 |
| 4,309,771 | 1/1982 | Wilkens | 375/58 |
| 4,369,520 | 1/1983 | Cerny, Jr. et al. | 455/137 |
| 4,398,063 | 8/1983 | Hass et al. | 179/2 EB |
| 4,475,010 | 10/1984 | Huensch et al. | 179/2 EB |
| 4,580,262 | 4/1986 | Naylor et al. | 371/5 |
| 4,596,042 | 6/1986 | Stangl | 455/56 |
| 4,608,711 | 8/1986 | Goldman | 455/33 |
| 4,641,322 | 2/1987 | Hasegawa | 375/1 |
| 4,672,658 | 6/1987 | Kavehrad et al. | 379/63 |
| 4,697,260 | 9/1987 | Grauel et al. | 379/60 |
| 4,718,081 | 1/1988 | Brenig | 379/60 |
| 4,723,266 | 2/1988 | Perry | 379/60 |
| 4,737,978 | 4/1988 | Burke et al. | 379/60 |
| 4,759,051 | 7/1988 | Han | 379/59 |
| 4,766,753 | 8/1988 | Schmidt | 379/60 |
| 4,771,448 | 9/1988 | Koohgli et al. | 379/60 |
| 4,811,421 | 3/1989 | Havel et al. | 455/69 |
| 4,955,082 | 9/1990 | Hattori et al. | 455/33 |
| 4,975,939 | 12/1990 | Sasaki | 379/610 |
| 5,054,110 | 10/1991 | Comroe et al. | 455/33 |
| 5,056,109 | 10/1991 | Gilhousen et al. | 375/1 |
| 5,101,501 | 3/1992 | Gilhousen et al. | 455/442 |
| 5,103,459 | 4/1992 | Gilhuosen et al. | 375/1 |
| 5,109,390 | 4/1992 | Gilhousen et al. | 370/335 |
| 5,127,100 | 6/1992 | D'Amico et al. | 455/33.1 |
| 5,134,715 | 7/1992 | Parl et al. | 455/64 |

(List continued on next page.)

FOREIGN PATENT DOCUMENTS

| | | | |
|---|---|---|---|
| 0532485 | 3/1993 | European Pat. Off. | H04B 7/26 |
| 9107036 | 11/1990 | WIPO | H04L 27/30 |
| 9201854 | 3/1992 | WIPO | H04J 3/16 |

OTHER PUBLICATIONS

"Handover with Simulcasting", *IEEE*, Per–Erik Ostling, May 10, 1992, pp. 823–826.

*Primary Examiner*—Edward F. Urban
*Attorney, Agent, or Firm*—Russell B. Miller; Brian S. Edmonston

[57] ABSTRACT

A plurality of methods for achieving the softer handoff process such that the performance of a system is improved. A first method is based on delaying the softer handoff process. A second method is based on reducing the power of transmissions from the sector having the weakest signal strength. A third method is based on eliminating transmissions from the sector having the weakest signal strength. In all three methods, reverse link demodulation in each sector may continue with or without the transmission of the forward link. In all three methods the operation could be based on the signal strength of the reverse link signal or the forward link. It is also possible to combine two or more of these methods to create a hybrid method.

16 Claims, 3 Drawing Sheets

U.S. PATENT DOCUMENTS

| | | | |
|---|---|---|---|
| 5,164,958 | 11/1992 | Omura | 375/1 |
| 5,175,878 | 12/1992 | Davis et al. | 466/103 |
| 5,179,571 | 1/1993 | Schilling | 375/1 |
| 5,216,692 | 6/1993 | Ling | 375/200 |
| 5,243,598 | 9/1993 | Lee | 370/95.3 |
| 5,267,261 | 11/1993 | Blakeney, II et al. | 375/1 |
| 5,276,907 | 1/1994 | Meidan | 455/436 |
| 5,301,352 | 4/1994 | Nakagawa et al. | 455/3.2 |
| 5,309,474 | 5/1994 | Gilhousene et al. | 375/1 |
| 5,309,503 | 5/1994 | Bruckert et al. | 455/436 |
| 5,327,577 | 7/1994 | Uddenfeldt | 455/33.2 |
| 5,345,467 | 9/1994 | Lomp et al. | 371/1 |
| 5,345,499 | 9/1994 | Benveniste | 379/59 |
| 5,428,818 | 6/1995 | Meidan et al. | 455/63 |
| 5,432,843 | 7/1995 | Bonta | 455/437 |

METHOD AND APPARATUS FOR REDUCING THE AVERAGE TRANSMIT POWER FROM A SECTORIZED BASE STATION

This is a continuation of application Ser. No. 08/144,901, filed Oct. 28, 1993, now abandoned.

BACKGROUND OF THE INVENTION

I. Field of the Invention

The present invention relates to communication systems, particularly to a plurality of methods for reducing the average transmit power from a sectorized base station.

II. Description of the Related Art

In a code division multiple access (CDMA) cellular telephone system or personal communications system, a common frequency band is used for communication with all base stations in a system. The common frequency band allow simultaneous communication between a mobile unit and more than one base station. Signals occupying the common frequency band are discriminated at the receiving station through the spread spectrum CDMA waveform properties based on the use of a high speed pseudonoise (PN) code. The high speed PN code is used to modulate signals transmitted from the base stations and the mobile units. Transmitter stations using different PN codes or PN codes that are offset in time produce signals that can be separately received at the receiving station.

In an exemplary CDMA system, each base station transmits a pilot signal having a common PN spreading code that is offset in code phase from the pilot signal of other base stations. During system operation, the mobile unit is provided with a list of code phase offsets corresponding to neighboring base stations surrounding the base station through which communication is established. The mobile unit is equipped with a searching element that allows the mobile unit to track the signal strength of the pilot signal from a group of base stations including the neighboring base stations.

A method and system for providing communication with the mobile unit through more than one base station during the handoff process are disclosed in U.S. Pat. No. 5,267,261, issued Nov. 30, 1993, entitled "MOBILE ASSISTED SOFT HANDOFF IN A CDMA CELLULAR TELEPHONE SYSTEM," assigned to the assignee of the present invention. Using this system, communication between the mobile unit and the end user is uninterrupted by the eventual handoff from an original base station to a subsequent base station. This type of handoff may be considered as a "soft" handoff in that communication with the subsequent base station is established before communication with the original base station is terminated. When the mobile unit is in communication with two base stations, a single signal for the end user is created from the signals from each base station by a cellular or personal communication system controller.

Mobile unit assisted soft handoff operates based on the pilot signal strength of several sets of base stations as measured by the mobile unit. The Active Set is the set of base stations through which active communication is established. The Neighbor Set is a set of base stations surrounding an active base station comprising base stations that have a high probability of having a pilot signal strength of sufficient level to establish communication. The Candidate Set is a set of base stations having a pilot signal strength of sufficient level to establish communication.

When communications are initially established, a mobile unit communicates through a first base station and the Active Set contains only the first base station. The mobile unit monitors the pilot signal strength of the base stations of the Active Set, the Candidate Set, and the Neighbor Set.

When a pilot signal of a base station in the Neighbor Set exceeds a predetermined threshold level, the base station is added to the Candidate Set and removed from the Neighbor Set at the mobile unit. The mobile unit communicates a message to the first base station identifying the new base station. A cellular or personal communication system controller decides whether to establish communication between the new base station and the mobile unit. Should the cellular or personal communication system controller decide to do so, the cellular system controller sends a message to the new base station with identifying information about the mobile unit and a command to establish communications therewith. A message is also transmitted to the mobile unit through the first base station. The message identifies a new Active Set that includes the first and the new base stations. The mobile unit searches for the new base station transmitted information signal and communication is established with the new base station without termination of communication through the first base station. This process can continue with additional base stations.

When the mobile unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the mobile unit generates and transmits a message to report the event. The cellular or personal communication system controller receives this message through at least one of the base stations with which the mobile unit is communicating. The cellular or personal communication system controller may decide to terminate communications through the base station having a weak pilot signal strength.

The cellular or personal communication system controller upon deciding to terminate communications through a base station, generates a message identifying a new Active Set of base stations. The new Active Set does not contain the base station through which communications are to be terminated. The base stations through which communication is established send the message to the mobile unit. The cellular or personal communication system controller also communicates information to the base station to terminate communications with the mobile unit. The mobile unit communications are thus routed only through base stations identified in the new Active Set.

Because the mobile unit is communicating with the end user though at least one base station at all times throughout the soft handoff processes, no interruption in communications occurs between the mobile unit and the end user. A soft handoff provides significant benefits in its inherent "make before break" communication over conventional "break before make" techniques employed in other cellular communication systems.

A typical cellular or personal communication system contains some base stations having multiple sectors. A multi-sectored base station comprises multiple independent transmit and receive antennas. The process of simultaneous communication with two sectors of the same base station is called softer handoff. The process of soft handoff and the process of softer handoff are the same from the mobile unit's perspective. However the base station operation in softer handoff is different from soft handoff. When a mobile unit is communicating with two sectors of the same base station, the demodulated data signals of both sectors are available for combination within the base station before the signals are passed to the cellular or personal communication system controller. Because the two sectors of a common base station share circuitry and controlling functions, a variety of information is readily available to sectors of a common base station that is not available between independent base stations. Also two sectors of a common base station send the same power control information to a mobile unit (as discussed below).

In a cellular or personal communication system, maximizing the capacity of the system in terms of the number of simultaneous telephone calls that can be handled is extremely important. System capacity in a spread spectrum system can be maximized if the transmitter power of each mobile unit is controlled such that each transmitted signal arrives at the base station receiver at the same level. In an actual system, each mobile unit may transmit the minimum signal level that produces a signal-to-noise ratio that allows acceptable data recovery. If a signal transmitted by a mobile unit arrives at the base station receiver at a power level that is too low, the bit-error-rate may be too high to permit high quality communications due to interference from the other mobile units. On the other hand, if the mobile unit transmitted signal is at a power level that is too high when received at the base station, communication with this particular mobile unit is acceptable but this high power signal acts as interference to other mobile units. This interference may adversely affect communications with other mobile units.

Therefore to maximize capacity in an exemplary CDMA spread spectrum system, the transmit power of each mobile unit within the coverage area of a base station is controlled by the base station to produce the same nominal received signal power at the base station. In the ideal case, the total signal power received at the base station is equal to the nominal power received from each mobile unit multiplied by the number of mobile units transmitting within the coverage area of the base station plus the power received at the base station from mobile units in the coverage area of neighboring base stations.

The path loss in the cellular or personal communication radio channel can be characterized by two separate phenomena: average path loss and fading. The forward link, from the base station to the mobile unit, operates on a different frequency than the reverse link, from the mobile unit to the base station. However, because the forward link and reverse link frequencies are within the same frequency band, a significant correlation between the average path loss of the two links exists. On the other hand, fading is an independent phenomenon for the forward link and reverse link and varies as a function of time.

In an exemplary CDMA system, each mobile unit estimates the path loss of the forward link based on the total power at the input to the mobile unit. The total power is the sum of the power from all base stations operating on the same frequency assignment as perceived by the mobile unit. From the estimate of the average forward link path loss, the mobile unit sets the transmit level of the reverse link signal. Should the reverse link channel for one mobile unit suddenly improve compared to the forward link channel for the same mobile unit due to independent fading of the two channels, the signal as received at the base station from this mobile unit would increase in power. This increase in power causes additional interference to all signals sharing the same frequency assignment. Thus a, rapid response of the mobile unit transmit power to the sudden improvement in the channel would improve system performance.

Mobile unit transmit power is also controlled by one or more base stations. Each base station with which the mobile unit is in communication measures the received signal strength from the mobile unit. The measured signal strength is compared to a desired signal strength level for that particular mobile unit. A power adjustment command is generated by each base station and sent to the mobile unit on the forward link. In response to the base station power adjustment command, the mobile unit increases or decreases the mobile unit transmit power by a predetermined amount. By this method, a rapid response to a change in the channel is effected and the average system performance is improved.

When a mobile unit is in communication with more than one base station, power adjustment commands are provided from each base station. The mobile unit acts upon these multiple base station power adjustment commands to avoid transmit power levels that may adversely interfere with other mobile unit communications and yet provide sufficient power to support communication from the mobile unit to at least one of the base stations. This power control mechanism is accomplished by having the mobile unit increase its transmit signal level only if every base station with which the mobile unit is in communication requests an increase in power level. The mobile unit decreases its transmit signal level if any base station with which the mobile unit is in communication requests that the power be decreased. A system for base station and mobile unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention.

Base station diversity at the mobile unit is an important consideration in the soft handoff process. The power control method described above operates optimally when the mobile unit communicates with each base station through which communication is possible. In doing so, the mobile unit avoids inadvertently interfering with communications through a base station receiving the mobile unit's signal at an excessive level but unable to communicate a power adjustment command to the mobile unit because communication is not established therewith.

Each base station transmits an equal amount of power to each mobile unit regardless of the location of the mobile unit. Thus as a mobile unit moves toward the edge of the base station coverage area, the signal strength of the forward link signal at the mobile unit falls. Also as the mobile unit moves to the edge of the coverage area of the current base station, the mobile unit generally moves closer to the base station coverage area of other base stations. Thus as the mobile unit moves toward the edge of the base station coverage area, the signal level from the current base station falls while interference from other base stations increases. The falling signal level also means that the signals are more sensitive to thermal noise and the noise created by the receiving circuitry in the mobile unit. This situation may be aggravated by a mobile unit located within an area where two sectors of a common base station overlap.

In a case where a set of base stations is operating at near capacity, the mobile unit located at the edge of the base station coverage area and within the coverage area of two sectors of the same base station may experience a drop in signal-to-noise ratio such that the quality of communications is degraded. The softer handoff process provides information to the base station that can be used to improve this situation. The improvement can be created by decreasing the average power transmitted by each sector of a base station. By decreasing the average power transmitted by each sector of a base station, the interference to all mobile units is reduced. Thus the interference to the mobile units at the edge of the coverage area is also reduced causing an increase in the average signal-to-noise ratio of mobile units a the edge of the coverage area.

In a system having soft and softer handoff capabilities and having neighboring base stations at or near capacity, a given amount of base station power is divided among the forward link signals such that each additional forward link signal transmitted from a base station decreases the power of other forward link signals. In a system operating at capacity, compare a base station having two sectors in which every mobile unit in the coverage area of the base station is in softer handoff mode to a base station having two sectors in which no mobile unit is in softer handoff mode. In the base station having every mobile unit in softer handoff, each forward link signal from each sector is transmitted at one-half of the power of each forward link signal from the base station having no mobile unit in softer handoff. Because, in the case where every mobile station is in softer handoff, the signals from each sector are combined in the mobile unit, the signal-to-interference ratio after combining is equal to the no handoff case if and only if each mobile unit is well served by both sectors.

However, in reality not every mobile station in a sectorized base station is well served by each sector. Thus, by determining which mobile units in a softer handoff are not being well served by one of the two sectors, the power transmitted from the weakest sector to a poorly served mobile units can be reduced or eliminated. A fewer number of signals to be transmitted from a sector means more power available for the remaining signals. When the base station transmits higher power forward link signals, the signal-to-interference for mobile units operating at handoff boundaries or at the edge of the coverage area is improved. Alternatively, as the number of signals is reduced, the total base station transmitter power can decrease which also results in less interference power in the system.

It is therefore the object of the present invention to improve forward link signal-to-interference ratio by reducing ineffectual forward link transmissions to mobile units in softer handoff, reducing the interference power to other mobiles and making more transmitter power available to all useful links to mobile stations.

It is therefore the object of the present invention to provide a plurality of methods to decrease the transmission power from a base station.

It is another object of the present invention to provide a plurality of methods to provide an enhanced softer handoff process to improve the forward link performance.

SUMMARY OF THE INVENTION

The present invention defines a plurality of methods for performing the softer handoff process such that the performance of a system is improved. A first method is based on delaying the softer handoff process. When the mobile unit informs a first sector through which it is communicating that a second sector from the same base station has a signal strength sufficient to support communications, the base station commands the second sector to find the mobile unit transmitted signal. The base station does not command the mobile unit to establish communication with the second sector until the reverse link signal received at the second sector exceeds a predetermined threshold. Delaying the softer handoff reduces the average number of mobile units in the soft handoff process and reduces the average total power transmitted by each sector thus reducing the total average interference to mobile units in the system.

A second method is based on reducing the power of transmissions from the sector having the weakest signal strength. When the mobile unit informs a first sector through which it is communicating that a second sector from the same base station has a signal strength sufficient to support communications, the base station commands the second sector to establish communication with the mobile unit. The base station also commands the mobile unit to establish communication with the second sector. After the mobile unit enters the softer handoff mode, the base station compares the reverse link signal strength from each of the sectors. The base station reduces the forward link transmission power for that mobile unit from the sector having the weakest reverse link signal strength indication. Reducing transmission power from the weaker sector reduces the average power transmitted from each sector and therefore reduces interference to mobile units in the system.

A third method is based on eliminating transmissions from the sector having the weakest signal strength. When the mobile unit informs a first sector through which it is communicating that a second sector from the same base station has a signal strength sufficient to support communications, the base station commands the second sector to establish communication with the mobile unit. The base station also commands the mobile unit to establish communication with the second sector. After the mobile unit enters the softer handoff mode, the base station monitors the reverse link signal strength from each of the sectors. If the reverse link signal strength from one sector falls below a predetermined threshold for more than a predetermined period of time, the base station discontinues forward link transmissions from the sector having the weakest signal strength indication. Discontinuing transmissions from the weaker sector reduces the average power transmitted from each sector and therefore reduces interference to mobile units in the system.

In all three methods above, reverse link demodulation in each sector may continue with or without the transmission of the forward link thus this method does not adversely effect reverse link performance or power control. In all three methods the operation could be modified such that the mobile unit informs the base station of received power on the forward link. The forward link power measurements from the mobile unit could be used as the criteria instead of the reverse link measurements made at the base station. It is also possible to combine two or more of these methods to create a hybrid method.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
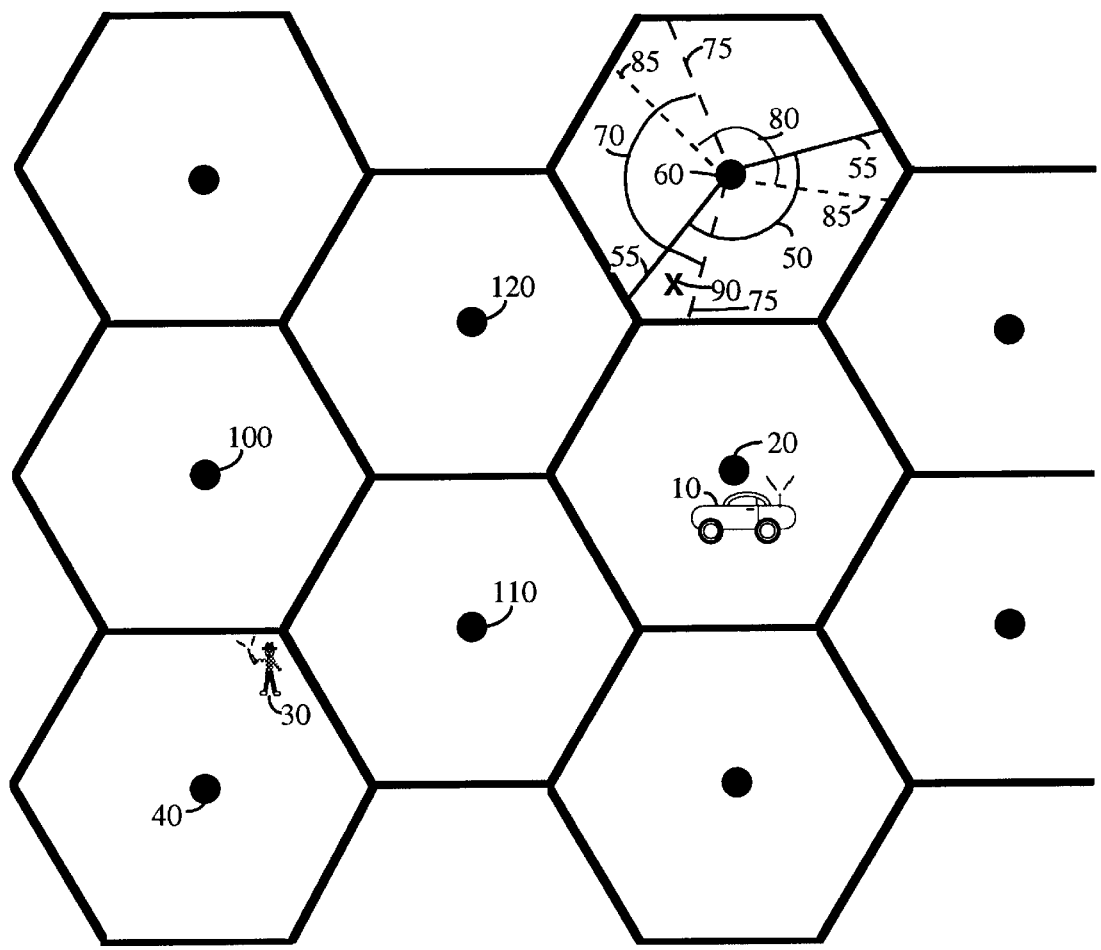
FIG. 1 is a diagram illustrating an exemplary base station coverage area structure.

FIG. 1 illustrates an exemplary base station coverage area structure. In such an exemplary structure, hexagonal base station coverage areas abut one another in a symmetrically tiled arrangement. Each mobile unit is located within the coverage area of one of the base stations. For example, mobile unit 10 is located within the coverage area of base station 20. In a code division multiple access (CDMA) cellular or personal communication telephone system, a common frequency band is used for communication with all base stations in a system allowing simultaneous communication between a mobile unit and more than one base station. Mobile unit 10 is located very close to base station 20 and therefore receives a large signal from base station 20 and relatively small signals from surrounding base stations. However mobile unit 30 is located in the coverage area of base station 40 but is close to the coverage area of base stations 100 and 110. Mobile unit 30 receives a relatively weak signal from base station 40 and similarly sized signals from base stations 100 and 110. Due to the decreased signal strength and the increased interference from neighboring base stations, mobile unit 30 has a lower overall signal to noise ratio with respect to base station 40 than mobile unit 10 has with respect to base station 20.

The exemplary base station coverage area structure illustrated in FIG. 1 is highly idealized. In the actual cellular or personal communication environment, base station coverage areas may vary in size and in shape. Base station coverage areas may tend to overlap with coverage area boundaries defining coverage area shapes different from the ideal hexagon shape. Furthermore, base stations may also be sectored such as into three sectors, as is well known in the art. Base station 60 is shown as a three sectored base station. However base stations with lesser or greater numbers of sectors are envisioned.

Base station 60 of FIG. 1 represents an idealized three sectored base station. Base station 60 has three sectors, each of which covers more than 120 degrees of the base station coverage area. Sector 50, having a coverage area indicated by the unbroken lines 55, overlaps the coverage area of sector 70, having a coverage area indicated by the coarse dashed lines 75. Sector 50 also overlaps the sector 80, having a coverage area as indicated by the fine dashed lines 85. For example, location 90 as indicated by the X is located in both the coverage area of sector 50 and sector 70.

In general a base station is sectorized to reduce the total interference power to mobile units located within the coverage area of the base station while increasing the number of mobile units that can communicate through the base station. For example, sector 80 would not transmit a signal intended for a mobile unit at location 90 and thus no mobile unit located in sector 80 is significantly interfered with by the communication of a mobile unit at location 90 with base station 60.

However for a mobile unit positioned at location 90, the total interference has contributions from sectors 50 and 70 and from base stations 20 and 120. If the sum of the interference becomes too large, compared to the signal strength of the intended signal, communication between a mobile unit at location 90 and base station 60 may degrade. The present invention is a method for reducing the interference in such a case. In fact the present invention reduces the interference to all mobile units operating within a sectorized base station and also mobile unit operating within the coverage area of neighboring base stations.

Figure 2:
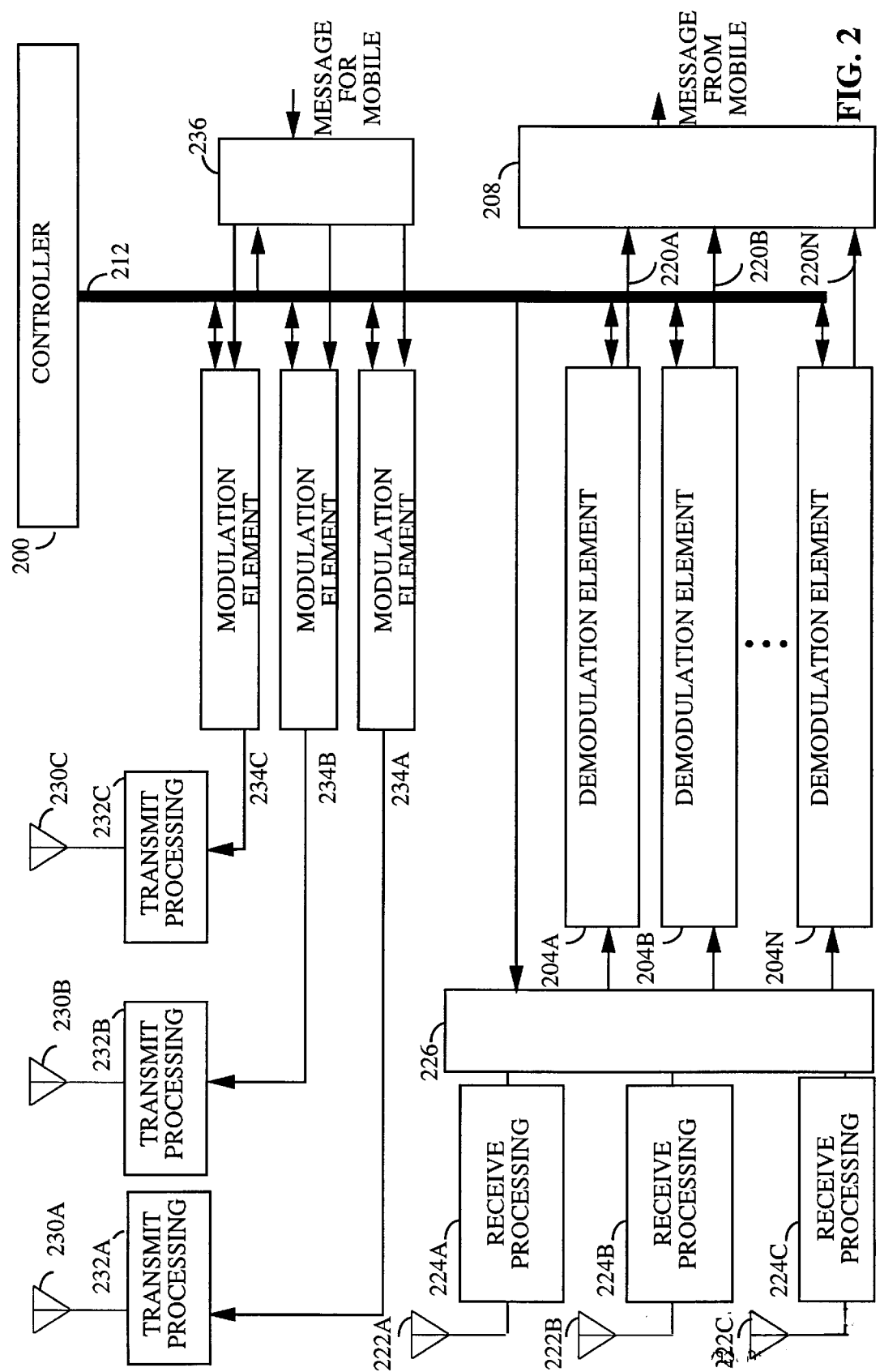
FIG. 2 is a block diagram illustrating an exemplary sectorized base station comprising multiple independent demodulation elements.

FIG. 2 illustrates an exemplary embodiment of a three sectored base station. In FIG. 2, each of antennas 222A–222C is the receive antenna for one sector and each of antennas 230A–230C is the transmit antenna for one sector. Antenna 222A and antenna 230A correspond to a common coverage area and can ideally have the same antenna pattern. Likewise antennas 222B and 230B, and antennas 222C and 230C correspond to common coverage areas respectfully. FIG. 2 represents a typical base station in that antennas 222A–222C have overlapping coverage areas such that a single mobile unit signal may be present at more than one antenna at a time. Although only one receive antenna is shown for each sector, typically two antennas are used for diversity with the receive signal combined for processing.

Figure 3:
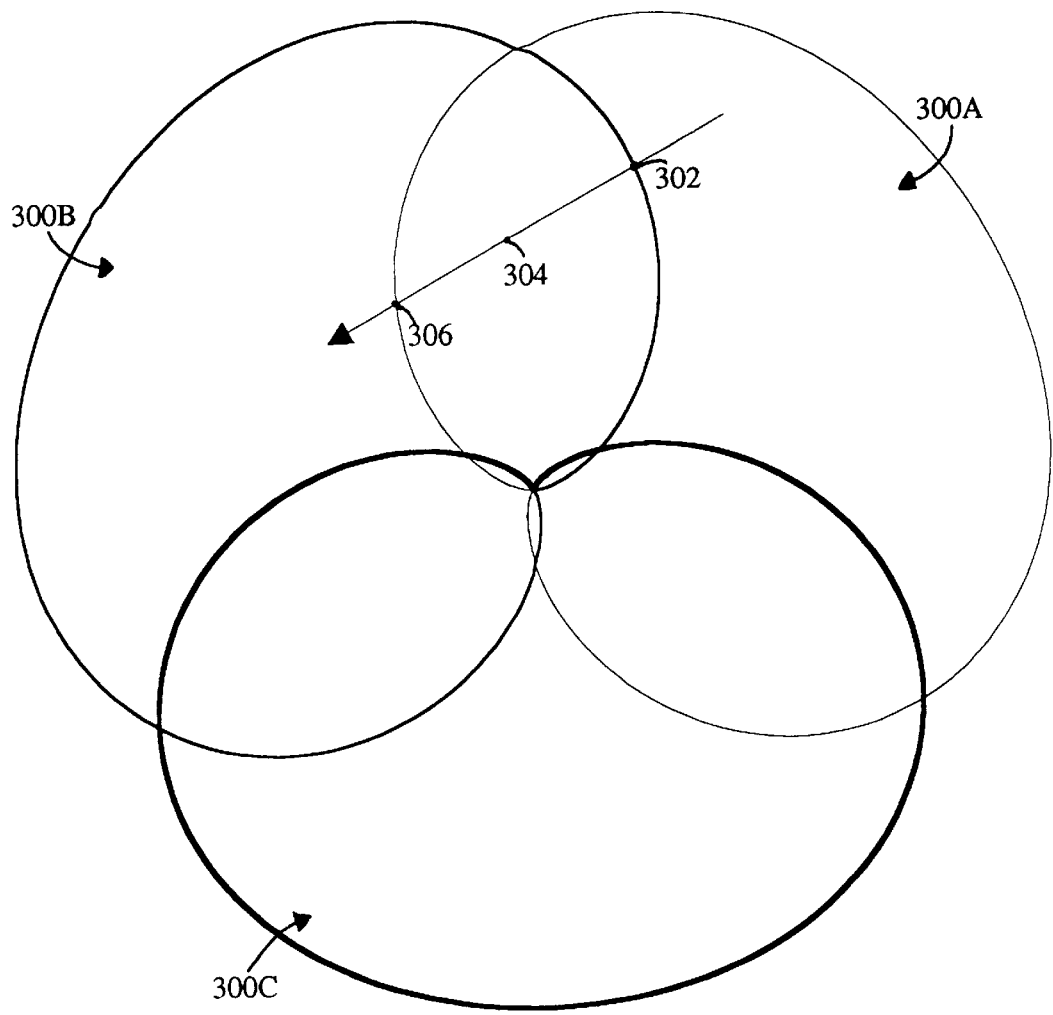
FIG. 3 is an exemplary representation of the coverage areas of three sectors of a sectorized base station.

FIG. 3 is a more realistic representation of the coverage areas of three sectors of a sectorized base station than base station 60 of FIG. 1. Coverage area 300A, as represented by the finest line, corresponds to the coverage area of both antennas 222A and 230A. Coverage area 300B, as represented by the medium width line, corresponds to the coverage area of both antennas 222B and 230B. Coverage area 300C, as represented by the heaviest line, corresponds to the coverage area of both antennas 222C and 230C. The shape of the three coverage areas is the shape produced by standard directional dipole antenna. The edges of the coverage areas can be thought of as the location at which a mobile unit receives the minimum signal level to support communication through that sector. As a mobile unit moves into the sector, the signal strength increases. As a mobile unit moves past the edge of the sector, communication through that sector may degrade. A mobile unit operating in softer handoff mode is likely to be located in the overlapped region of two coverage areas.

Referring again to FIG. 2, antennas 222A, 222B, and 222C supply the received signal to receive processings 224A, 224B, and 224C respectively. Receive processings 224A, 224B, and 224C process the RF signal and convert the signal to digital bits. Receive processings 224A, 224B, and 224C filter the digital bits and provide the resulting digital bits to interface port 226. Interface port 226 may connect any of the three incoming signal paths to any of the demodulation elements 204A–204N under the control of controller 200 through interconnection 212.

Demodulation elements 204A–204N are also controlled by controller 200 through interconnection 212. Controller 200 assigns demodulation elements 204A–204N to one of the plurality of information signals from a single mobile unit from any one of the sectors. Demodulation elements 204A–204N produce data bits 220A–220N each representing an estimate of the data from the single mobile unit. Data bits 220A–220N are combined in symbol combiner 208 to produce a single estimate of the data from the mobile unit. The output of symbol combiner 208 is aggregate soft decision data suitable for Viterbi decoding. Notice that symbol combiner 208 can combine signals from just one sector to produce an output or it can combine symbols from multiple sectors as selected by the interface port 226. Each one of demodulation elements 204A–204N measures a signal strength estimation of the signal that it is demodulating and provides the estimation to controller 200. A single power adjustment command is created from the estimated signal strengths independent of the sector through which the signal is received. Thus each sector in the base station transmits the same power adjustment command to a single mobile unit.

When symbol combiner 208 is combining signals from a mobile unit that is communicating through more than one sector, the mobile unit is in softer handoff. The base station may send the output of symbol combiner 208 to a decoder and then to a cellular or personal communication system controller. A cellular or personal communication system controller may receive decoded symbols from a common mobile unit from multiple base stations and produce a single output. This process is referred to as soft handoff.

Demodulation elements 204A–204N also provide several output control signals to controller 200 through interconnection 212. The information passed to controller 200 includes an estimate of the signal strength of the signal assigned to a particular demodulator. Typically this information is not passed to the cellular or personal communication system control. Therefore sectors of a common base station demodulating signals from a common mobile unit are much more intimately related than two base stations sending signals to a common cellular or personal communication controller. The intimacy of the relationship of two sectors supporting a softer handoff mode with a single mobile unit provides the basis for the present invention.

In many applications, an actual base station also comprises at least one searcher element. The searcher element is also capable of demodulating a signal and is used to continually scan the time domain in search of available signals. The searcher element identifies a set of available signals and passes the information to the controller. The controller may use the set of available signals to assign or re-assign the demodulation elements to the most advantageous signals available. The placement of the searcher element is the same as the placement of the demodulating elements in FIG. 2. As such the searcher elements may also be assigned to a signal from a plurality of sectors of a common base station. In the most general case, demodulation elements 204A–204N can be assumed to comprise some elements that are capable of performing the searching function.

The transmit process shown in FIG. 2 receives a message for a mobile unit from the end user through the cellular or personal communication system controller. The message can be sent on one or more of antennas 230A–230C. Interface port 236 connects the message for the mobile unit to one of more of modulation elements 234A–234C as set by controller 200. Modulation elements 234A–234C modulate the message for the mobile unit with the appropriate PN code. The modulated data from modulation elements 234A–234C is passed to transmit processing 232A–232C respectively. Transmits processings 232A–232C convert the message to an RF frequency and transmit the signal at an appropriate signal level through antennas 230A–230C respectively. Notice that interface port 236 and interface port 226 operate independently in that receiving a signal from a particular mobile unit through one of antennas 222A–222C does not necessarily mean that the corresponding transmit antenna 230A–230C is transmitting a signal to the particular mobile unit. Also note that the power adjustment commands sent through each antennae are the same, thus sector diversity in a common base station is not critical for the optimal power control performance.

The handoff process as described in U.S. Pat. No. 5,267, 261 referred to above, describes a process that is summarized in the following steps.

Normal operation of softer handoff:

1: Mobile unit is communicating with base station X through sector alpha antenna meaning base station X, sector alpha is identified as a member of the Active Set.
2: Mobile unit monitors the pilot signal from base station X, sector beta antenna and base station X, sector beta is identified as a member of the Neighbor Set. The pilot signal strength from base station X, sector beta antenna exceeds a predetermined threshold.
3: Mobile unit identifies base station X, sector beta as a member of the Candidate Set and informs base station X through sector alpha antenna.
4: Base station X establishes the availability of resources in sector beta.
5: Sector beta antenna begins to receive a reverse link signal from mobile unit.
6: Sector beta antenna begins to transmit a forward link signal to mobile unit.
7: Base station X through sector alpha antenna updates the mobile unit Active Set to identify base station X, sector beta.
8: Mobile unit establishes communication with base station X, sector beta antenna. Mobile unit combines the signals from sector alpha antenna and sector beta antenna based on the signal strength of the pilot signal from the corresponding sector.
9: Base station X combines the signals from mobile unit received through sector alpha antenna and sector beta antenna (softer handoff).

The first method to reduce the number of mobile units in the softer handoff mode is based on delaying the softer handoff process. The process inserts an additional step between steps 5 and 6 that we will label step 5.1. Step 5.1 adds the additional function as follows:

5.1: Determine the signal strength of the reverse link signal from the mobile unit. Pause the process at this step until the reverse link signal strength exceeds a predetermined threshold.

Step 5.1 delays the onset of softer handoff thus reducing the total number of forward link transmissions. Even while the forward link transmissions are delayed, the reverse link signal received by sector beta may be combined with the reverse link signal from sector alpha.

Referring again to FIG. 3, suppose a mobile unit follows the path indicated the arrow. At point 302, the mobile unit enters the coverage area of sector 300B from sector 300A. At this point, sector 300B would be moved from the Neighbor Set to the Candidate Set. The mobile unit informs the base station of the new addition to the Candidate Set. If resources are available in sector 300B, sector 300B begins to receive the reverse link signal from the mobile unit. Sector 300B does not begin to transmit a signal and instead monitors the reverse link signal from the mobile unit. As the mobile unit moves further into sector 300B, the signal strength from the mobile unit as received by sector 300B increases. Suppose at point 304 the signal strength of the received signal exceeds the predetermined threshold of step 5.1. The process continues and sector 300B begins to transmit a forward link signal to the mobile unit. Sector 300A updates the mobile unit Active Set to include sector 300B.

Note that this method does not degrade the advantages of softer handoff and the make-before-break handoff process. In FIG. 3, as the mobile unit continued to travel along the arrow, the mobile unit would be in a softer handoff state from point 304 until point 306. At point 306, communication with sector 300A can be terminated because the mobile unit is no longer within the coverage area of sector 300A. Without the addition of step 5.1, the mobile unit would be in softer handoff from point 302 to point 306.

This first method could be modified to achieve similar results by basing the delay on the signal strength of the forward link signal as measured at the mobile unit. The modified step 5.1 would be as follows:

5.1: Determine the signal strength of the pilot signal at the mobile unit from sector beta antenna. Pause the process at this step until the pilot signal strength exceeds a predetermined threshold.

The transfer of the pilot signal strength could automatically be transmitted from the mobile unit as part of the notification of a new entry in the Candidate Set. The mobile unit could transmit the signal strength periodically or mobile unit could respond to a request for the signal strength from the base station. The mobile unit could be aware of the threshold and notify the base station when the pilot signal strength exceeds the predetermined level.

No matter which variation of first method is used, the average transmission power from each sector is reduced. By delaying the forward link transmissions to the set of mobile units that are in the coverage area of a first sector and have not deeply penetrated the coverage area of a second sector, each mobile unit is subjected to a decrease amount of interference on the forward link. Notice that this method does not effect soft handoff (handoff between two independent base stations).

The second method involves reducing the power of the forward link transmission. The original steps 1 through 9 above would remain the same. An additional two steps would be added following step 9 as follows:

10: Determine the reverse link signal strength received through each sector antenna.

11: Reduce the power of the transmitted forward link signal by a predetermined amount from the sector antenna having the weakest reverse link signal.

Alternatively the same steps could be executed based on the forward link transmission power as follows:

10: Determine the forward link signal strength received from each sector at the mobile unit and provide this information to the base station.

11: Reduce the power of the transmitted forward link signal by a predetermined amount from the sector antenna having the weakest forward link signal as measured at the mobile unit.

No matter which variation of the second method is used, the average transmission power from each sector is reduced. By reducing the forward link transmissions to a set of mobile units that are in the coverage area of two sectors, each mobile unit in the two sectors is subjected to a decrease amount of interference on the forward link. Again this method does not effect soft handoff.

A potential unfavorable consequence to this method exists. The mobile unit may combine signals from two sectors based on the pilot signal strength from each of the sectors as received at the mobile unit. Therefore the mobile unit is assuming a fixed relationship between the strength of the pilot signal from a sector and the strength of the information signal intended specifically for the mobile unit. When the power of the transmitted information signal is reduced, the combination ratio will be unbalanced by some amount. The unbalance causes the combination process to operate with non-optimal performance. If the reduction ratio is small, for instance if the power intended for the mobile unit is reduced by about 3 dB, this effect may be negligible. This problem could be fixed by having the base station inform the mobile unit of the relation between pilot signal strength and information signal strength. The mobile could respond to this information by appropriately modifying the combiner ratio to reflect the change.

A third method adds new steps 10 and 11 to the original steps 1 through 9 as follows:

10: Monitor the received reverse link signal at each sector antenna. When the reverse link signal falls below a threshold for a predetermined period of time at a sector antenna, inform the mobile unit to stop demodulating the forward link signal from the weak sector antenna.

11: Stop sending the forward link signal to the mobile unit from the weak sector antenna.

12: Return to step 5.

Alternatively the same steps could be executed based on the forward link transmission power as follows:

10: Determine the forward link signal strength level received from each sector antenna at the mobile unit and provide this information to the base station.

11: When the forward link signal from a sector antenna falls below a threshold for a predetermined period of time, inform the mobile unit to stop demodulating the forward link signal from the weak sector antenna.

12: Stop transmitting the forward link signal from the weak sector antenna.

No matter which variation of the third method is used, the average transmission power from a sector is reduced. By terminating the forward link transmissions to the set of mobile units in the coverage area of two sectors before signal strength would mandate termination, each mobile unit in both sectors is subjected to a decrease in interference power on the forward link. Notice that neither alternative to the third method requires the weak sector to discontinue demodulating the reverse link signal from the mobile unit. Again this method does not effect soft handoff.

Each of the three methods defined herein may be combined with one or more of the other methods. Also there are many obvious variations of the embodiments of methods 1, 2, and 3 including the simple rearrangement of steps within each method.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for improving the signal-to-interference ratio in a communication system having a set of base stations with at least one base station comprised of multiple sectors comprising the steps of:

communicating between a mobile unit and a first sector of said base station and simultaneously communicating between said mobile unit and a second sector of said base station, and combining a signal from said mobile unit received through said first sector with a signal from said mobile unit received through said second sector;

measuring signal strength of said signal from said mobile unit received through said first sector;

measuring signal strength of said signal from said mobile unit received through said second sector;

comparing the signal strength of said signal from said mobile unit received through said first sector and the signal strength of said signal from said mobile unit received through said second sector in order to identify the sector receiving the weakest signal of said signals from said mobile unit received through said first and said second sector; and reducing signal strength of a signal from said identified sector to said mobile unit while continuing to combine signal energy from said mobile unit received through said first sector with signal energy from said mobile unit received through said second sector.

2. The method of claim 1 wherein said step of communicating between said mobile unit and said first sector of said base station includes the step of establishing bi-directional communication by both transmitting and receiving signal energy, and wherein the step of communicating between said mobile unit and said second sector of said base station includes the step of establishing bidirectional communication by both transmitting and receiving signal energy.

3. A method for reducing interference in a communication system having a base station comprised of multiple sectors comprising the steps of:

receiving through a first sector antenna of said base station a first signal from a mobile unit;

receiving through a second sector antenna of said base station a second signal from said mobile unit and combining said second signal with said first signal;

transmitting signal energy through said first sector antenna to said mobile unit and simultaneously transmitting signal energy through said second sector antenna to said mobile unit, thereby simultaneously communicating between said base station and said mobile unit through said first and second sector antennas;

measuring the signal strength of said first signal;

measuring the signal strength of said second signal and comparing the signal strength of said second signal to the signal strength of said first signal; and terminating forward link information transmission from said base station to said mobile unit through said second sector antenna by ceasing transmission of said signal energy through said second sector antenna when the signal strength of said second signal is less than the signal strength of said first signal, said base station subsequently continuing to combine signal energy received from said mobile unit through said first and second sector antennas.

4. A method for reducing interference in a communication system having a base station comprised of multiple sectors comprising the steps of:

receiving through a first sector antenna of said base station a first signal from a mobile unit;

receiving through a second sector antenna of said base station a second signal from said mobile unit and combining said first signal and said second signal;

transmitting signal energy through said first sector antenna to said mobile unit and simultaneously transmitting signal energy through said second sector antenna to said mobile unit;

measuring the signal strength of said signal energy received from said first sector antenna at said mobile unit;

measuring the signal strength of said signal energy received from said second sector antenna at said mobile unit and comparing the signal strength of said signal energy received from said first and said second sector antennas; and terminating forward link information transmission from said base station to said mobile unit through said second sector antenna by ceasing transmission of said signal energy therethrough when the signal strength of said signal energy received from said second sector antenna is less than the signal strength of said signal energy received from said first sector antenna, said base station continuing to combine signal energy received from said mobile unit through said first and second sector antennas subsequent to said ceasing of transmission of said signal energy through said second sector antenna.

5. A method for reducing interference in a communication system having a base station comprised of multiple sectors comprising the steps of:

communicating bi-directionally between a mobile unit and a first sector of said base station;

transmitting through an antenna of a second sector of said base station a pilot signal;

measuring, at said mobile unit, signal strength of said pilot signal from said antenna of said second sector of said base station and comparing said signal strength to a predefined threshold;

notifying by said mobile unit said base station through said first sector when said signal strength of said pilot signal from said antenna of said second sector exceeds said predefined threshold;

receiving through said antenna of said second sector of said base station a reverse link signal from said mobile unit and combining said reverse link signal with signal energy received from said mobile unit through said first sector; and delaying transmission of a forward link signal from said second sector of said base station to said mobile unit until signal energy of said pilot signal received at said mobile unit through said second sector exceeds a second predefined threshold.

6. The method for reducing interference in a communication system of claim 5 further comprising the step of combining at said base station said reverse link signal from said mobile unit received through said second sector of said base station with a reverse link signal received through said first sector from said mobile unit to produce an aggregate signal independent of whether said step of transmitting said forward link signal has begun.

7. The method for reducing interference in a communication system of claim 6 further comprising the steps of:

creating a power control command for said mobile unit based on an energy level of said aggregate signal; and transmitting said power control command to said mobile unit from said antenna of said first sector of said base station.

8. A method for reducing interference in a communication system having a base station comprised of multiple sectors comprising the steps of:

communicating bi-directionally between a mobile unit and a first sector of said base station;

transmitting through an antenna of a second sector of said base station a pilot signal;

measuring, at said mobile unit, signal strength of said pilot signal from said antenna of said second sector of said base station and comparing said signal strength to a predefined threshold;

notifying said base station through said first sector when said signal strength of said pilot signal from said antenna of said second sector exceeds said predefined threshold;

receiving through said antenna of said second sector of said base station a reverse link signal from said mobile unit and combining said reverse link signal with signal energy received from said mobile unit through said first sector; and delaying transmission of a a forward link signal from said second sector of said base station to said mobile unit until signal energy of said reverse link signal received at said base station through said second sector exceeds a second predefined threshold.

9. The method for reducing interference in a communication system of claim 8 further comprising the step of combining at said base station said reverse link signal from said mobile unit received through said second sector of said base station with a reverse link signal received through said first sector from said mobile unit to produce an aggregate signal independent of whether said step of transmitting said forward link signal has begun.

10. The method for reducing interference in a communication of claim 9 further comprising the steps of:

creating a power control command for said mobile unit based on an energy level of said aggregate signal; and transmitting said power control command to said mobile unit from said antenna of said first sector of said base station.

11. A method for improving the signal-to-interference ratio in a spread spectrum communication system having a set of base stations with at least one base station comprised of multiple sectors comprising the steps of:

receiving through a first sector antenna of said base station a first spread spectrum signal from said mobile unit;

receiving through a second sector antenna of said base station a second spread spectrum signal from said mobile unit;

combining said first and second spread spectrum signals in order to simultaneously establish communication between said base station and said mobile unit through said first and second sector antennas;

measuring the signal strength of said first spread spectrum signal;

measuring the signal strength of said second spread spectrum signal and comparing the signal strength of said second spread spectrum signal to the signal strength of said first spread spectrum signal; and reducing a power level of a transmission from said base station to said mobile unit through said second sector antenna based on the signal strength of said second spread spectrum signal and the signal strength of said first spread spectrum signal and continuing to combine said first and second spread spectrum signals.

12. The method for improving the signal-to-interference ratio in a spread spectrum communication system of claim 11 wherein in said step of reducing, said transmission power is reduced to zero and said first and second spread spectrum signals are continued to be combined.

13. A method for improving the signal-to-interference ratio in a spread spectrum communication system having a set of base stations with at least one base station comprised of multiple sectors comprising the steps of:

receiving through a first sector antenna of said base station a first spread spectrum signal from said mobile unit;

receiving through a second sector antenna of said base station a second spread spectrum signal from said mobile unit;

combining said first and second spread spectrum signals in order to simultaneously establish communication between said base station and said mobile unit through said first and second sector antennas;

transmitting from said first sector antenna of said base station a signal;

transmitting from said second sector antenna of said base station a signal;

measuring the signal strength of said signal from said first sector at said mobile unit;

measuring the signal strength of said signal from said second sector at said mobile unit;

comparing the signal strength of said signal from said first sector to the signal strength of said signal from said second sector; and reducing a power level of a transmission from said base station to said mobile unit through said second sector antenna based on the signal strength of said signal from said second sector and the signal strength of said signal from said first sectors and continuing to combine said first and second spread spectrum signals.

14. The method for improving the signal-to-interference ratio in a spread spectrum communication system of claim 13 wherein in said step of reducing, said transmission power is reduced to zero.

15. A method for improving the signal-to-interference ratio in a spread spectrum communication system having a set of base stations with at least one base station comprised of multiple sectors comprising the steps of:

receiving through a first sector antenna of said base station a first spread spectrum signal from said mobile unit;

receiving through a second sector antenna of said base station a second spread spectrum signal from said mobile unit;

combining said first and second spread spectrum signals in order to simultaneously establish spread spectrum communication between said base station and said mobile unit through said first and second sector antennas;

measuring the signal strength of said first spread spectrum signal;

measuring the signal strength of said second spread spectrum signal;

comparing the signal strength of said second spread spectrum signal to the signal strength of said first spread spectrum signal in order to identify the sector receiving the weakest one of said first and second spread spectrum signals; and reducing signal strength of the spread spectrum signal from said identified sector to said mobile unit and continuing to combine said first and second spread spectrum signals.

16. A method for improving the signal-to-interference ratio in a communication system having a set of base stations with at least one base station comprised of multiple sectors comprising the steps of:

communicating between a mobile unit and a first sector of said base station and simultaneously communicating between said mobile unit and a second sector of said base station, and combining a signal from said mobile unit received through said first sector with a signal from said mobile unit received through said second sector;

measuring signal strength of a forward link signal from said first sector received at said mobile unit;

measuring signal strength of a forward link signal from said second sector received at said mobile unit;

comparing the signal strength of the signal from said first sector and the signal strength of the signal from said second sector in order to identify the sector providing the weakest signal; and reducing signal strength of a signal from said identified sector to said mobile unit while continuing to combine signal energy from said mobile unit received through said first sector with signal energy from said mobile unit received through said second sector.

* * * * *